J. R. BLAKESLEE.
Cutting and Punching Dies for Nut-Machines.
No. 157,571. Patented Dec. 8, 1874.
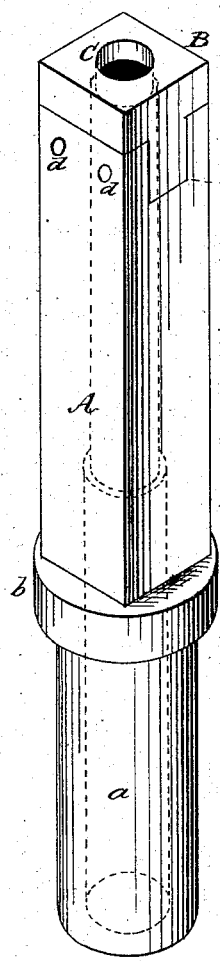
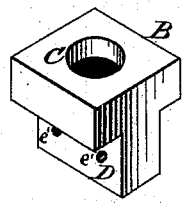
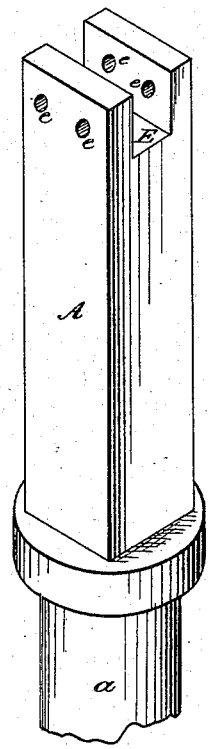
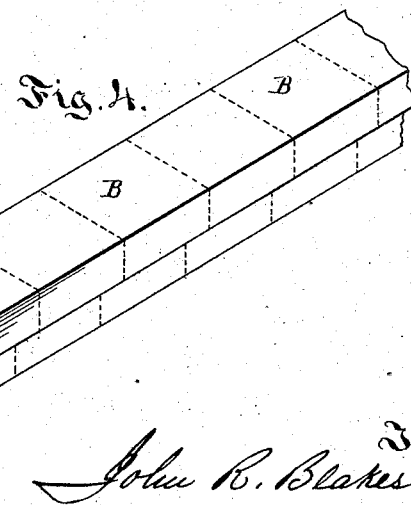
Witnesses: Inventor:

UNITED STATES PATENT OFFICE.

JOHN R. BLAKESLEE, OF CLEVELAND, OHIO, ASSIGNOR TO THE RHODES RIVET COMPANY, OF SAME PLACE.

IMPROVEMENT IN CUTTING AND PUNCHING DIES FOR NUT-MACHINES.

Specification forming part of Letters Patent No. 157,571, dated December 8, 1874; application filed November 30, 1874.

*To all whom it may concern:*

Be it known that I, JOHN R. BLAKESLEE, of Cleveland, in the county of Cuyahoga and State of Ohio, have invented certain new and useful Improvements in Removable Cutting and Punching Face for the Dies of Hot-Pressed-Nut Machines, of which the following is a specification:

My invention consists in forming a cutting or punching face for forming hot-pressed nuts separate from its stock portion, which face will constitute the die proper, said face being constructed with a cutting edge or face equal to the face of the nut to be formed, and with a central opening or perforation of a size corresponding with the opening to be made in the nut, said face being formed with a central tongue or flange for entering a recess or socket constructed in the end of the stock portion, and the two connected by suitable rivets, bolts, or pins passing transversely through the stock and the flange, in such a manner that the die-face can be removed when impaired by usage, reground, retempered, and replaced upon the stock portion, without subjecting the latter to heat and deteriorating it to effect such removal.

The thickness of the removable face should be about three times as thick as the bar of iron to be acted upon, and have the usual opening through it, communicating with the opening in the stock portion for receiving and discharging the punchings, but the extent of the opening from its cutting-edge inwardly should only be about equal to the thickness of a single punching, the opening in rear of it being much enlarged, so as to freely discharge the punchings into the stock, and thus preventing the lodgment in the opening in the face of two or more punchings, as such would have a tendency to expand, become fixed, and soon result in bursting the removable face. If the nut to be formed is a square, hexagon, or other polygonal shape, then the face is correspondingly formed.

The faces are constructed from a bar of chilled iron, hardened steel, or other suitable metal, which is selected or brought by proper tools to a width equal to the width of the nut desired to be produced, and such bar is planed down on each side, so as to form a central tongue or flange when it is divided off into squares, and provided with the opening corresponding with the opening desired to be produced in the nut.

In the drawings, Figure 1 is a perspective view of a cutting and punching stock having my improved removable die-face attached thereto. Fig. 2 is a perspective view of the cutting and punching stock with the die-face removed. Fig. 3 is a perspective view of the die-face detached. Fig. 4 is a perspective view of the metal plate from which the die-faces are cut.

Referring to the drawings, the letter A designates the stock of the cutting and punching die, which is of tubular form, so as to receive and discharge the punchings, as usual in the manufacture of hot-pressed nuts. Said stock portion is, in the present example, constructed with an extension, $a$, for connecting it in or to a slide, and with a collar, $b$, for bearing upon such slide, to prevent the movement of the stock in its seat during the process of cutting off a blank nut from a bar of metal. The stock portion A has imparted to it a square, hexagonal, or other polygonal shape, corresponding with the contour of the die-box within which it is to operate, said stock being provided with a face or die, B, capable of being removed and replaced. The connection of the die with the stock is effected by forming a recess or socket, E, of suitable form in the upper end of the stock, into which is inserted a web, tongue, or flange, D, constructed on the die or face, said tongue or flange corresponding in form to the interior of the socket. The removable face or die is designated by the letter B, and, in the present example, is constructed with a tread and a web, so as to be of a T-iron form, though it is evident that the web may be of other form, such as a dovetail, the socket for its reception being correspondingly formed. The web, tongue, or flange should be constructed with apertures $e'$, to correspond with the apertures $e$ in the walls forming the socket on the end of the stock, so that fastening bolts, pins, or rivets can be inserted into such apertures for the purpose of connecting the die or face with the stock, the construction being such that the fastening medium can be easily withdrawn for disconnecting the die from the stock. The removable face should be made of cast-steel, hardened steel, or other suitable metal, so as to afford a durable cutting-edge for severing the blank from a bar of metal and a durable punching-edge. An opening, C, of a diameter corresponding to the diameter to be made in the nut, extends throughout the die-face, to communicate with the opening in the stock portion; but such opening should only extend from the front cutting-edge inwardly to a depth equal to a single "punching," the opening in the die-face in rear of such depth being much enlarged, as is also the opening in the stock portion, so that but a single punching will be permitted to remain in the opening C; for if such was permitted, the heated punchings would expand and be crowded in the die-face, and soon burst the same. The extreme ends of the stock portion and the bottom of the socket form a flat, square, and substantial basis for the die or face B, and make the same remain firm in its seat.

The faces are constructed from a bar of chilled iron, hardened steel, or other suitable metal, which is selected or brought by proper tools to a width equal to the width of the nut desired to be produced, and such bar is planed down on each side, so as to form a central tongue or flange when it is divided off into squares, and provided with the opening corresponding with the opening desired to be provided in the nut, as clearly illustrated in Fig. 4, which mode of construction is simple and economical.

Cappings or faces have heretofore been applied to punches for use in machines for perforating metal plates, but in such the capping or face has been loosely placed upon the punch, so that said capping or face is disconnected from the punch, and discharged with the punching at each descent of the punch; and such I do not claim.

What I claim is—

The removable cutting and punching face or die, constructed with a flange for connecting with a stock, and with a central opening through such die and flange, a portion of the length of such opening being of a uniform depth and diameter equal to the thickness of a single punching, substantially as described, said parts forming a cutting and punching die for a hot-pressed-nut machine, as set forth.

In testimony that I claim the foregoing I have hereunto set my hand.

JOHN R. BLAKESLEE.

Witnesses:
　JAMES L. NORRIS,
　A. H. NORRIS.